(12) United States Patent
Hart et al.

(10) Patent No.: US 12,040,623 B2
(45) Date of Patent: Jul. 16, 2024

(54) HYBRID RENEWABLE POWER GENERATION CONTROL

(71) Applicant: GENERAL ELECTRIC COMPANY, Schenectady, NY (US)

(72) Inventors: Patrick Hart, Schenectady, NY (US); Honggang Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 17/430,525

(22) PCT Filed: May 8, 2019

(86) PCT No.: PCT/US2019/031294
§ 371 (c)(1),
(2) Date: Aug. 12, 2021

(87) PCT Pub. No.: WO2020/226639
PCT Pub. Date: Nov. 12, 2020

(65) Prior Publication Data
US 2022/0131386 A1     Apr. 28, 2022

(51) Int. Cl.
*H02J 3/46*     (2006.01)
*G05B 13/02*     (2006.01)
*H02J 3/38*     (2006.01)

(52) U.S. Cl.
CPC .............. *H02J 3/46* (2013.01); *G05B 13/024* (2013.01); *H02J 3/381* (2013.01); *H02J 2300/20* (2020.01)

(58) Field of Classification Search
CPC .......... H02J 3/46; H02J 3/381; H02J 2300/20; H02J 13/00028; G05B 13/024; Y04S 10/123; Y02E 40/70
See application file for complete search history.

(56) References Cited

U.S. PATENT DOCUMENTS 7,983,799 B2   7/2011   Bose et al.
9,077,204 B2   7/2015   More et al.
(Continued)

FOREIGN PATENT DOCUMENTS

EP   1933441 A1   6/2008
EP   2863285 A2   4/2015
(Continued)

OTHER PUBLICATIONS

International Search Report and Written Opinion dated Apr. 2, 2020 which was issued in connection with PCT/US2019/031294.
(Continued)

*Primary Examiner* — Charles Cai
(74) *Attorney, Agent, or Firm* — Armstrong Teasdale LLP

(57) ABSTRACT

The example embodiments are directed to a system and method for dynamically controlling classes of assets in a hybrid generation power plant. In one example, the system may include a plurality of classes of power assets with at least one class comprising a non-renewable power source and at least one class comprising a renewable power source, and a power controller configured to manage a class of power assets from among the plurality of classes, the power controller including a pre-processing module configured to dynamically shape an error being fed into a respective power source of the class of power assets, and an asset control module configured to dynamically adjust a power setpoint of the respective power source of the class of power assets.

20 Claims, 11 Drawing Sheets

(56) References Cited

U.S. PATENT DOCUMENTS

| | | | |
|---|---|---|---|
| 9,870,593 B2 | 1/2018 | Sedighy et al. | |
| 2008/0143304 A1* | 6/2008 | Bose | H02J 3/381 |
| | | | 323/205 |
| 2009/0062969 A1 | 3/2009 | Chandra et al. | |
| 2009/0138130 A1* | 5/2009 | Aigner | B60R 16/03 |
| | | | 700/282 |
| 2012/0053751 A1 | 3/2012 | Borresen et al. | |
| 2013/0168236 A1* | 7/2013 | Zadeh | C25B 15/02 |
| | | | 204/229.2 |
| 2014/0304025 A1 | 10/2014 | Steven et al. | |
| 2016/0211664 A1 | 7/2016 | Subbotin et al. | |
| 2017/0077711 A1 | 3/2017 | Oesselke et al. | |
| 2017/0187194 A1* | 6/2017 | Hart | H02J 4/00 |
| 2019/0140452 A1* | 5/2019 | Suzuki | H02M 1/36 |
| 2019/0366953 A1* | 12/2019 | Ganireddy | H02J 3/40 |

FOREIGN PATENT DOCUMENTS

| | | | |
|---|---|---|---|
| EP | 3188337 A1 | 7/2017 | |
| EP | 3358426 A1 | 8/2018 | |
| WO | 2015177202 A1 | 11/2015 | |
| WO | 2017089402 A1 | 6/2017 | |
| WO | 2018/215785 A1 | 11/2018 | |

OTHER PUBLICATIONS

Pandey et al., "Frequency Regulation in Hybrid Power System Using Iterative Proportional-Integral-Derivative H∞ Controller", Journal of Electric Power Components and Systems, vol. 42, pp. 132-148, 2014.

Bouzid et al., "A survey on control of electric power distributed generation systems for microgrid applications", Renewable and Sustainable Energy Reviews, vol. 44, pp. 751-766, Apr. 2015.

Sandeep et al., "Capacitive energy storage with optimized controller for frequency regulation in realistic multisource deregulated power system", Journal of ScienceDirect, vol. 147, pp. 1108-1128, Mar. 2018.

* cited by examiner

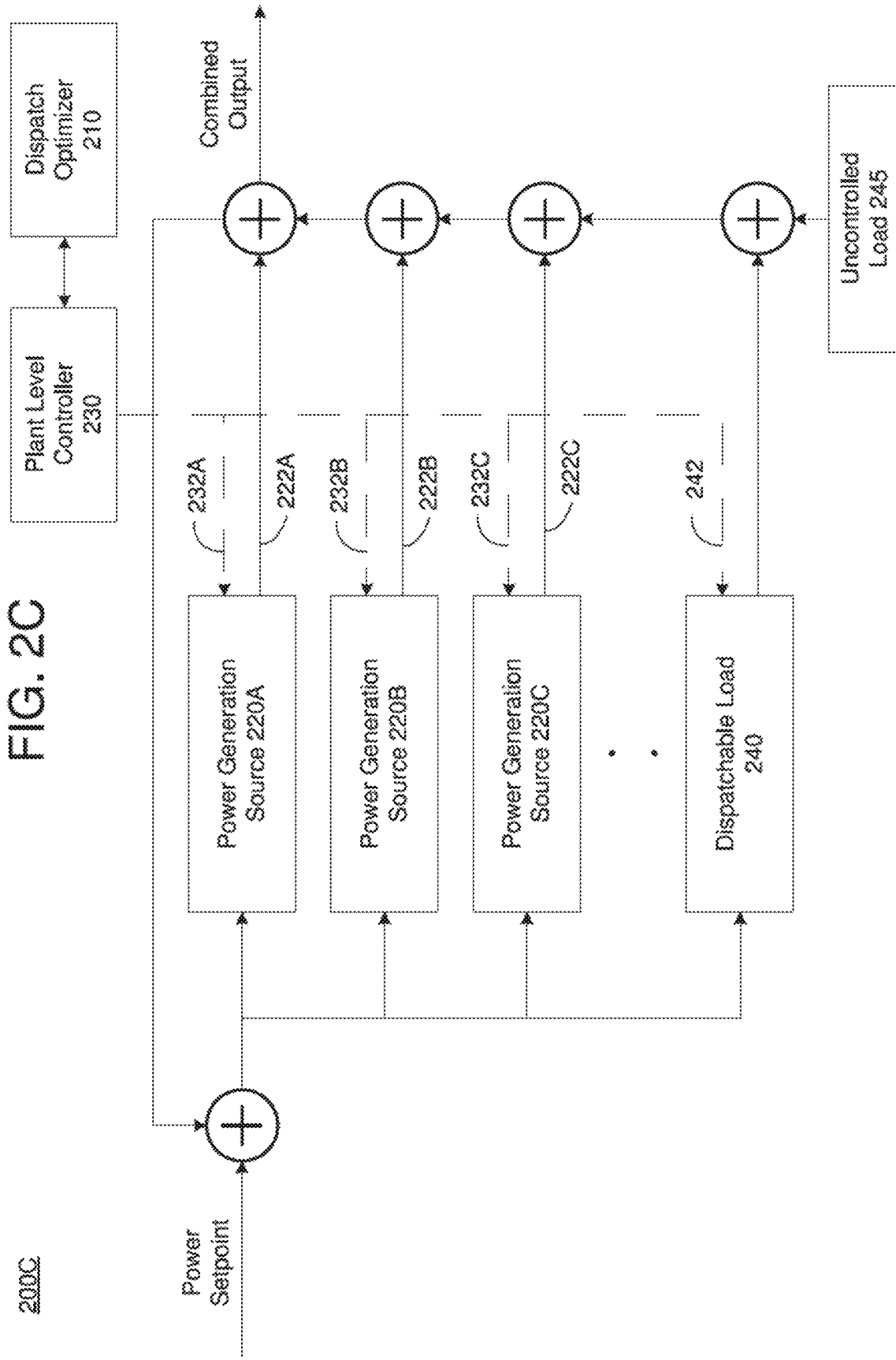

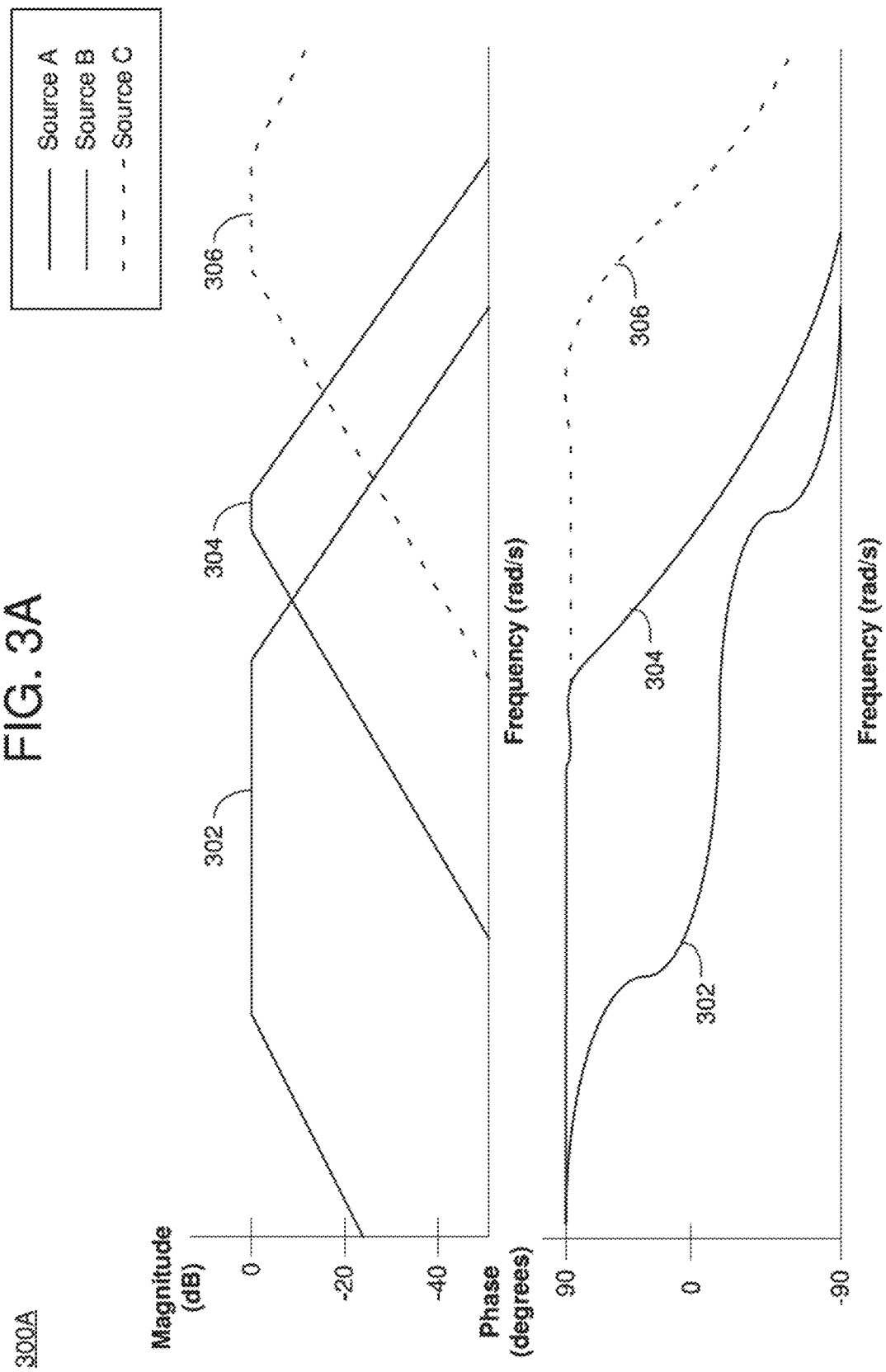

FIG. 3B
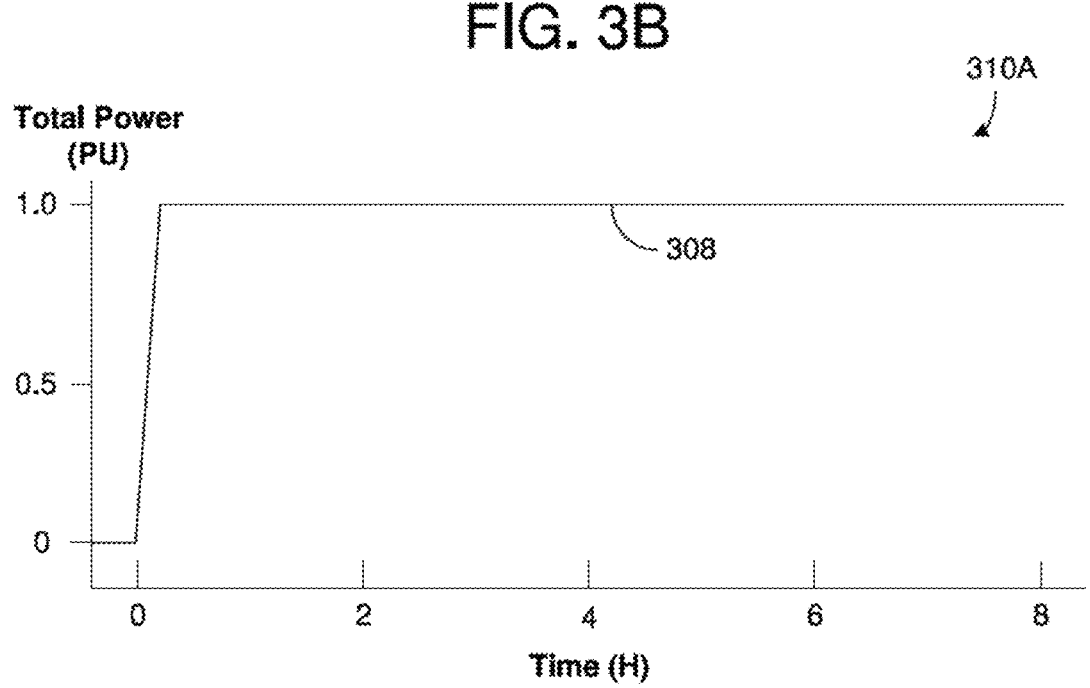
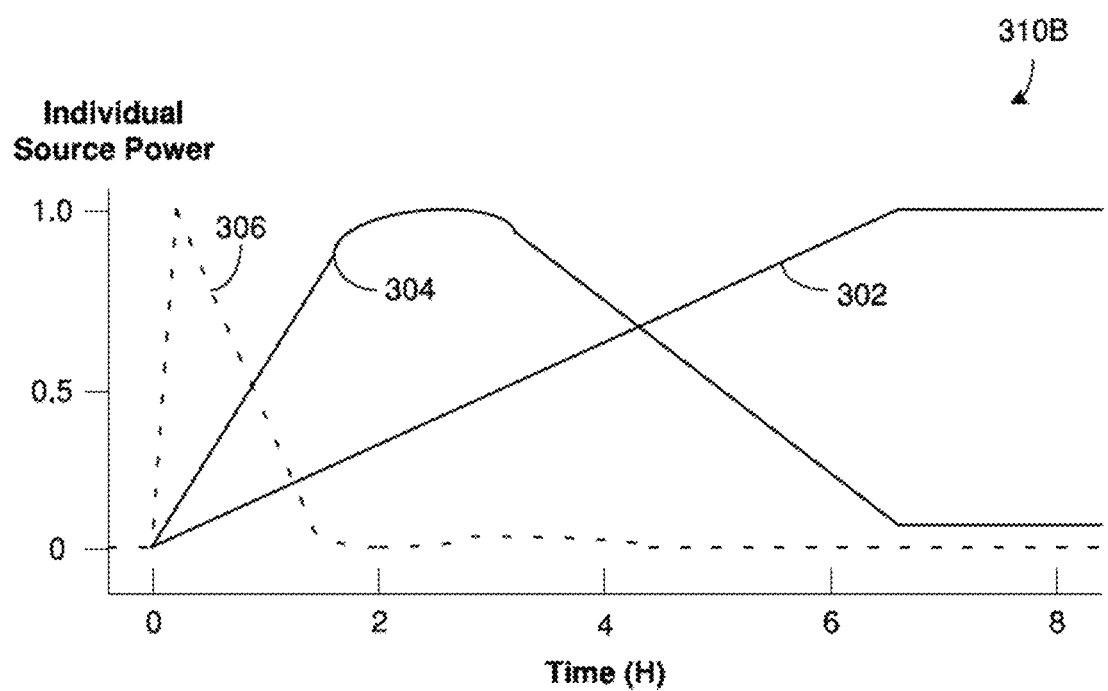

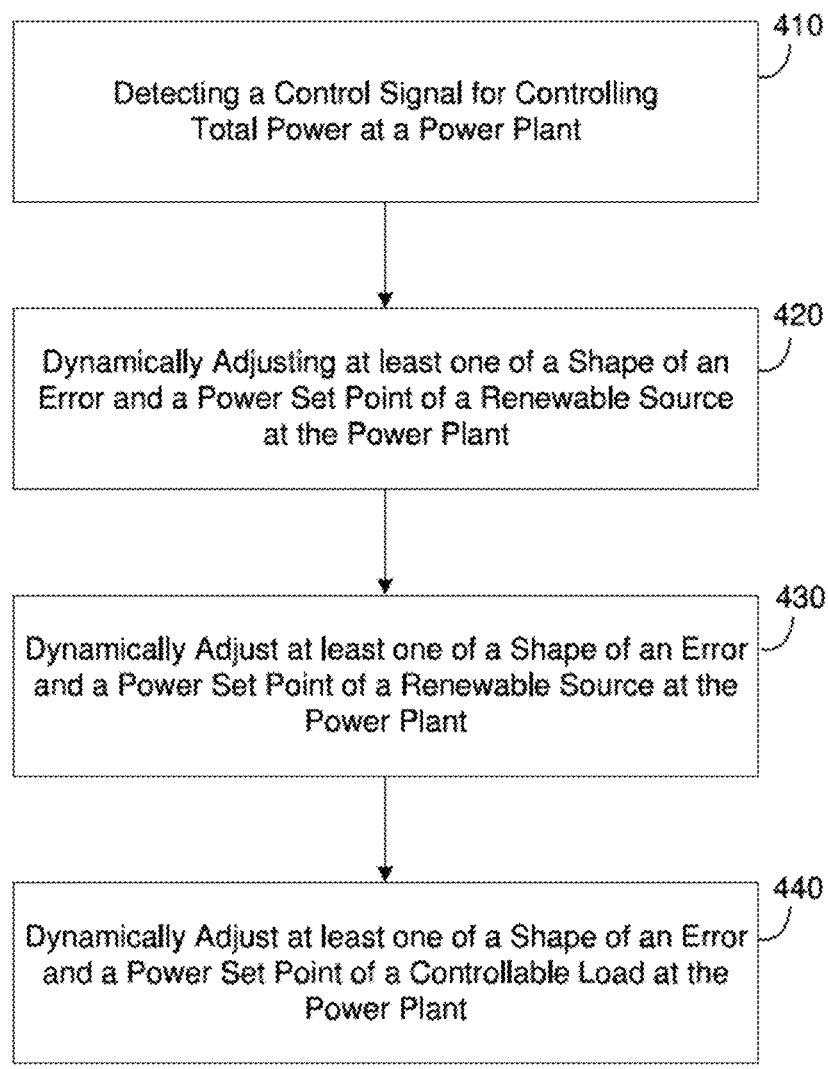

HYBRID RENEWABLE POWER GENERATION CONTROL

BACKGROUND

Generating electricity requires generating electric power from sources of primary energy. For electric utilities in the power industry, it is the first stage in providing electricity to end users. Electricity is not freely found in nature in large quantities. Therefore, utilities typically produce electricity via power stations (also called "power plants"). For example, a plant may generate electricity using electromechanical generators that are driven by heat engines fueled by combustion (coal, natural gas, etc.) or nuclear fission but also by other means such as the kinetic energy of flowing water and wind. Other energy sources include solar photovoltaics, geothermal power, and the like.

The selection of electricity production modes and their economic viability varies in accordance with demand and region. The economics vary considerably around the world, resulting in widespread selling prices. Hydroelectric plants, nuclear power plants, thermal power plants and renewable sources have their own advantages and disadvantages, and selection is based upon the local power requirement and the fluctuations in demand. All power grids have varying loads on them but the daily minimum is the base load, supplied by plants which run continuously. Nuclear, coal, oil and gas plants can supply base load.

Power plants are being increasingly integrated with other power sources and loads, such as batteries, gas engines, electric vehicles, wind turbines and solar panels, to provide hybrid renewable power generation system. But these different power sources have different attributes. Some power sources are not efficient, but are very responsive and are able to respond to changes in demand quickly. Other power sources are extremely efficient, but require significant amounts of time to increase (ramp-up) the amount of power provided. For many power sources, the power source is more responsive to a request to decrease the amount of power than to a request to increase the amount of power.

Some of the difficulties with power generation control include the need to autonomously coordinate different power assets with different time scales during load up/down while still meeting the overall power demand. In addition, due to needs from either the overall system or single component (abnormality, degradation, fault), there is also a need to separately send an offset for each power asset controller. Excess energy may be stored for use during times when power demand exceeds power generation capacity. Further, it is often desirable to optimize use of renewable, non-renewable, and stored energy resources so that they may be used more advantageously.

SUMMARY

The example embodiments are directed to a framework for controlling a hybrid renewable power generation system. The framework may include a control system that can control various power attributes of each individual asset/source based on dynamic factors. The hybrid renewable power generation system may include a farm with different types of power sources including non-renewable sources (gas, petroleum, coal, etc.) and renewable sources (solar, wind, hydro, etc.). As one example, the control system may modify a set point for one or more non-renewable sources differently than a set point for one or more renewable sources to optimize a cost of the power being generated. As another example, the control system may modify all sources the same, or even turn one or more sources off. In some embodiments, the control system may instruct one or more power sources to deviate from a set point provided by a utility company to handle one or more unforeseen events or to improve the cost efficiency of the system.

The control system can regulate each power source asset separately and independently from the others based on a system architecture. Here, each power source asset may include a control module that is common among each power source asset and which includes a pre-processing module, an asset control module, and/or a post-processing module. The control system may dynamically adjust a setting the pre-processing module, the asset control module, or the post-processing model of a particular power source asset independently from the other power source assets. The architecture provides for integrating a renewable power sources together with a non-renewable power sources while also allowing for dynamic controls of the different classes of assets to adjust for certain needs or costs.

In accordance with an example embodiment, provided is a power system that may include a plurality of classes of power assets, at least one class comprising a non-renewable power source and at least one class comprising a renewable power source, and a power controller configured to manage a class of power assets from among the plurality of classes, the power controller including a pre-processing module configured to dynamically shape an error being fed into a respective power source of the class of power assets; and an asset control module configured to dynamically adjust a power setpoint of the respective power source of the class of power assets.

In accordance with another example embodiment, provided is a power system that may include a plurality of classes of power assets, where each class of power assets comprises a different type of power source, a first power controller configured to manage a first class of power assets from among the plurality of classes which comprises a renewable power source, and a second power controller configured to manage a second class of power assets from among the plurality of classes which comprises a non-renewable power source, wherein the first and second power controllers each comprise a pre-processing module configured to dynamically shape an error being fed into a respective power source of a respective class of power assets, and an asset control module configured to dynamically adjust a power setpoint of the respective power source of a respective class of power assets.

In accordance with another example embodiment, provided is a method which may include at least one of detecting a control signal for controlling plant power which is received from at least one of a dispatch optimizer and a plant operator station, adjusting a renewable power source at the plant by dynamically modifying at least one of a shape of an error being fed to the renewable power source and a power set point of the renewable power source, and adjusting a non-renewable power source at the plant by dynamically modifying at least one of a shape of an error being fed to the non-renewable power source and a power set point of the renewable power source.

BRIEF DESCRIPTION OF THE DRAWINGS

FIG. 2C is a diagram illustrating an alternative architecture for controlling different power source assets in accordance with some embodiments.

FIG. 3A is a diagram illustrating a bode plot of power responses of different power source assets in accordance with some embodiments.

FIG. 3B is a diagram illustrating a total power plant output and individual source power outputs in accordance with some embodiments.

FIG. 4 is a diagram illustrating a method for controlling power in a hybrid renewable power generation system in accordance with some embodiments.

Figure 1:
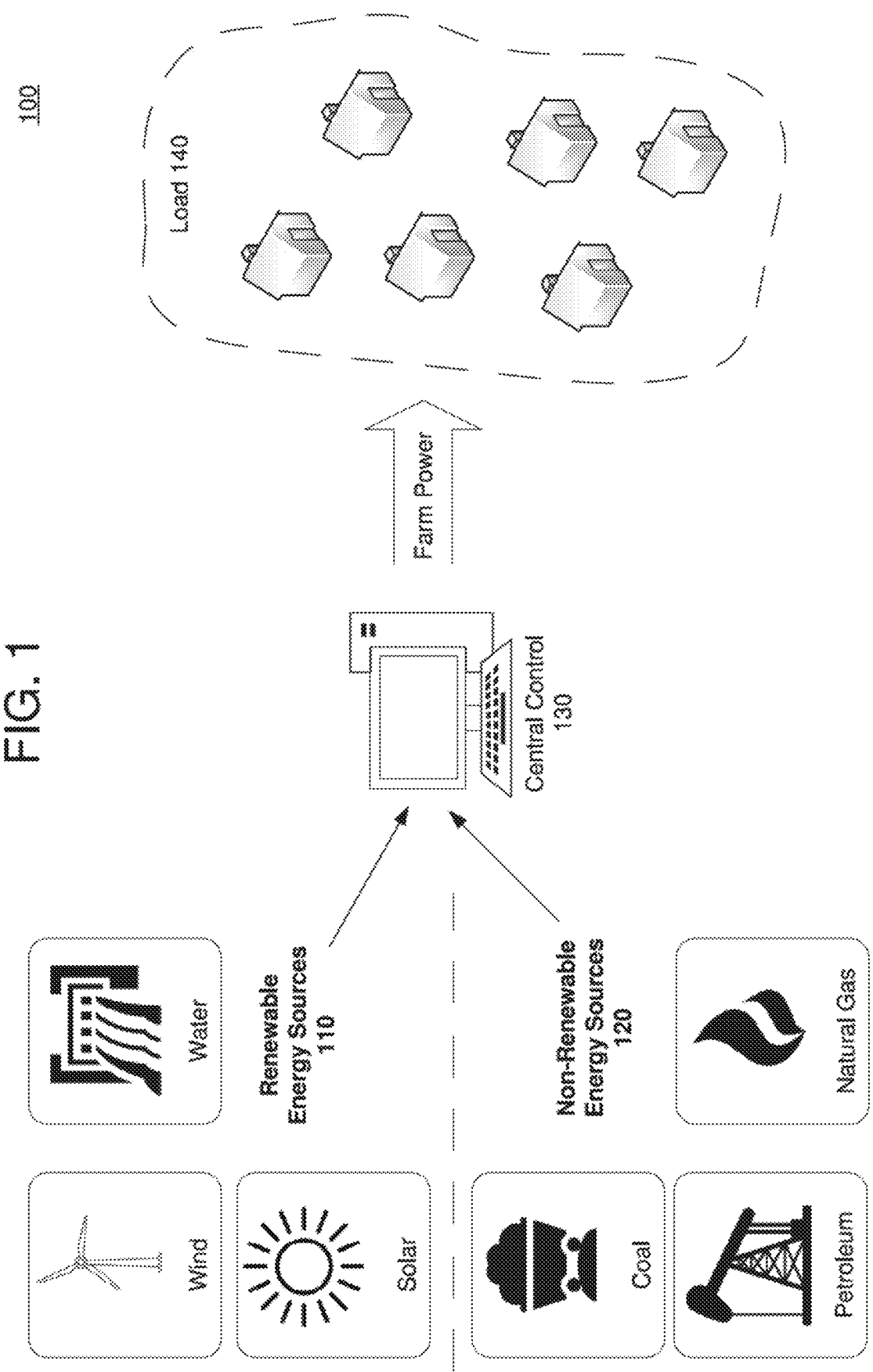
FIG. 1 is a diagram illustrating a power generation system for delivering power to a load in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many power systems include multiple power source assets of different types. For example, a power system may include fuel cells, batteries, gas engines, hydroelectric power, and the like. When producing energy, these different power sources have different attributes. Some power sources are not efficient, but are very responsive and are able to respond to changes in demand quickly. Other power sources are extremely efficient, but require significant amounts of time to increase the amount of power provided. Still other power sources provide near constant amounts of power that are extremely difficult to adjust. For many power sources, the power source is more responsive to a request to decrease the amount of power than to a request to increase the amount of power.

The example embodiments are directed to a control system for managing a power system that includes a plurality of power assets to provide power equal to demand while automatically altering the power output of the different power assets for efficiency or other desired parameters. The system enables efficient operation of a plurality of connected power assets to rapidly respond to changes in demand. Also, the system is not limited to any single type of power asset or combination of power assets, but may be implemented with any power generating device that is configured as described herein. For example, the system may manage a hybrid system which includes both non-renewable power source assets such as batteries, gas engines, a coal fired turbines, fuel cells, nuclear generators, and the like, and renewable assets such as wind turbines, solar cells, hydroelectric generators, geothermal taps, and the like. By independently controlling each power asset over time, efficient operation of the plurality of assets contained in the power system allow for constant power while allowing the power assets to transfer the load from one asset to another.

The control system implements a generic decentralized control framework for integrating non-renewable power source assets into a hybrid system that includes renewable power source assets. The control framework includes a power controller that can be used to receive a signal from an optimizer or a plant controller and which can independently and dynamically control a class of power source assets based on system needs, commercial expectations, error detection, and the like. In some embodiments, each class (type) of power source may include a shared power controller which can thereby control the power output of the group of power sources as a whole. As another example, one power controller (such as shown in FIG. 2B) may be used to control multiple types of power sources at the plant.

Furthermore, each power source asset may be equipped with a control framework which includes various modules such as a pre-processing module (M1), an asset control module (M3), a post-processing module (M2), and/or the like. Each module may be dynamically controlled by the control system which can independently modify power output of different classes of power source assets based on needs of the system.

In these examples, the pre-processing module enables coordinative power generation for each power source asset without the need to use a centralized controller. The asset control module enables the optimizer to implement a different power output setpoint than initially provided by a utility or other entity. Meanwhile, the post-processing module can be used to bypass a control algorithm being used by a power source asset and allow free running output, or the like.

The hybrid system described herein offers lower operating cost by leveraging free renewable energy. In addition, the control system may create and implement various unique control schemes which reduce the cost for system installation and maintenance. The example embodiments provide a broader application for both transient and steady state control, while enabling independent regulation of each power source separately through commands that are receive from a plant controller or an economic optimizer.

FIG. 1 illustrates a power generation system 100 for delivering power to a load 140 in accordance with some embodiments. Referring to FIG. 1, the power generation system includes a power farm with non-renewable power source assets 110 and renewable power source assets 120, energy storage and potentially some load. The renewable power source assets 120 may include solar, wind, rain, tides, waves, biomass, geothermal heat, and the like. The non-renewable power source assets 110 may include fossil fuels such as coal, petroleum, natural gas, and the like. In this example, a central controller 130 may be used to coordinate power output of the different power source assets 110 and 120. As further described below, the central controller 130 may include a dispatch optimizer as described below. The central controller 130 may include an on-premises server, a cloud platform, a personal computer, a workstation, and the like.

The central controller 130 may include a user interface for a plant controller to monitor power being output by the power source assets 110 and 120. In addition, the central controller may monitor other analytics such as machine learning algorithms and analytics providing suggestions on maintenance, setting changes, part replacements, and the like.

In the example of FIG. 1, it may be necessary to autonomously coordinate the different power source assets 110 and 120 with different time scales during load up/down while still meeting the overall power demand. For example, the central controller 130 may control the overall system or single component based on various events (abnormality, degradation, fault, etc.) In some embodiments, the central controller 130 may separately send offset for each power asset controller among the different power sources 110 and 120. Excess energy may be stored for use during times when power demand exceeds power generation capacity in a power storage (not shown). In some embodiment, though in a mixed-generation environment, non-renewable sources may be called upon instead of, or in addition to, stored energy.

In some cases, it can be desirable to optimize use of renewable, non-renewable, and stored energy resources so that they may be used more advantageously. There is still a need for a seamless integration between economic optimizer and each asset controllers. There is yet another need to make the power asset controller universal so that they can be used in a plug and play fashion.

Figure 2A:
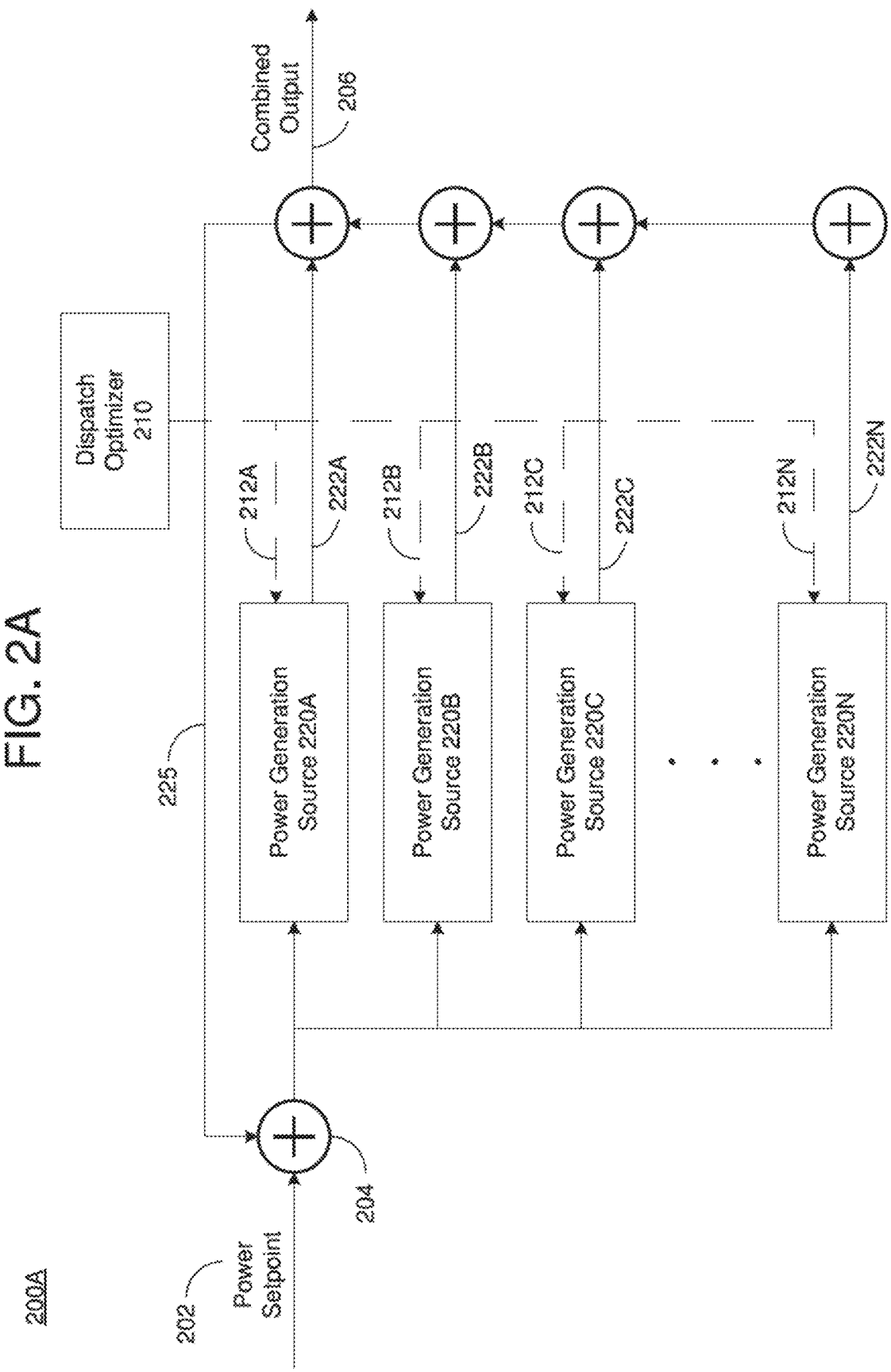
FIG. 2A is a diagram illustrating an architecture for controlling different power source assets in accordance with some embodiments.
Figure 2B:
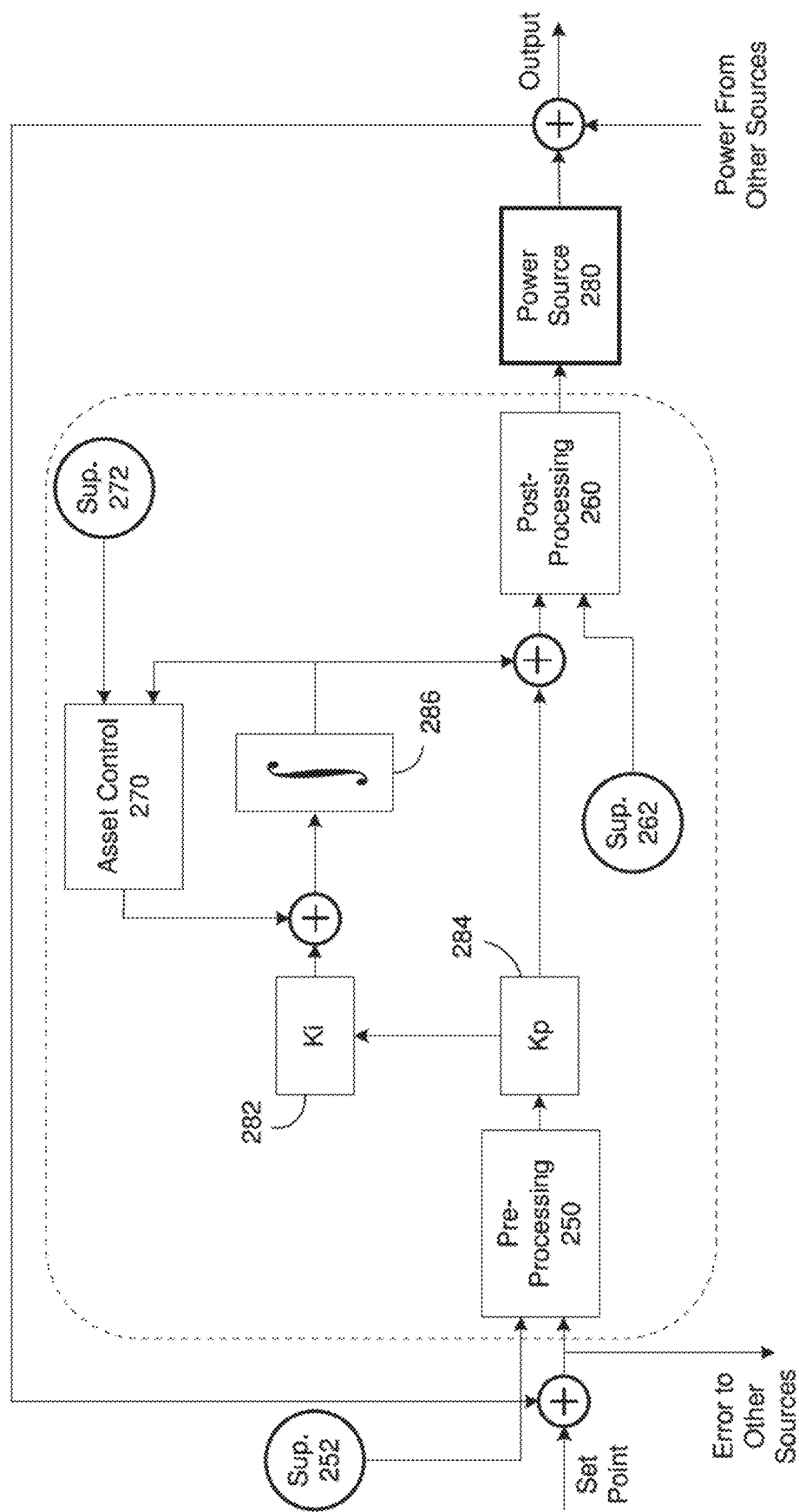
FIG. 2B is a diagram illustrating a framework of a power controller in accordance with some embodiments.

FIG. 2A illustrates a power system architecture 200A for controlling different power source assets in accordance with some embodiments. Referring to FIG. 2A, the architecture 200A includes a plurality of power sources 220A, 220B, 220C, . . . 220N (also referred to herein as power source assets). In this example, the power system may be a hybrid power system that includes different kinds of power sources such as non-renewables and renewables. In the exemplary embodiment, each power source asset 220A, 220B, 220C, . . . 220N outputs an amount of power 222A, 222B, 222C, . . . 222N, respectively. Here, the outputs may be combined into a total amount of power 206 for the farm and output to a power grid (not shown). The total amount of power 206 that is output to power grid is the combined amounts of power 222A, 222B, 222C, . . . 222N. Each power source asset 220A, 220B, 220C, . . . 220N may be connected (via a network) to a computing system which can transmit and receive signals from a supervisory layer of the system such as a dispatch optimizer 210, a plant controller 230, or the like.

Power system architecture 200A also includes a power feedback loop 225, wherein power feedback loop 225 communicates the total amount of power 206 to a power system controller 204. Power system controller 204 receives total amount of power 206 from power feedback loop 225 and a power setpoint 202 (also known as power demand amount). In some embodiments, power setpoint 202 is set by a utility associated with power grid. Power system controller 204 may determine an error amount based on the difference between total amount of power 206 and power setpoint 202. Error amount may drive power outputs 222A, 222B, 222C, . . . 222N of power source assets 220A, 220B, 220C, . . . 220N. In the exemplary embodiment, error amount is the amount of additional power needed to be generated to meet power setpoint 202. In the exemplary embodiment, power system 200A does not output more power than needed by power setpoint 202. In this example, the number of power source assets is not limited to any particular number or any particular kind. For example, the power system architecture 200A may include any number of power assets combined together to contribute power to meet power setpoint 202.

According to various embodiments, the power system architecture 200 also includes a dispatch optimizer 210 (also referred to herein as an optimizer). The optimizer 210 may be part of a general control system that includes the power system controller 204. The optimizer 210 may generate control signals 212A, 212B, 212C, . . . 212N for dynamically modifying the power settings (output) of the power source assets 220A, 220B, 220C, . . . 220N. As further described below with respect to FIG. 2B, each power source asset may be controlled by or otherwise include a control framework implemented therein that provides for dynamic adjust/modification of various power control settings for an individual power source asset.

In this way, the optimizer 210 can implement a supervisory control layer/optimization to allow the power source assets 220A, 220B, 220C, . . . 220N to perform optimally. This optimizer 210 can control the rate at which power is passed off from one power source asset to another. This is a closed-loop architecture with multiple controllers in the loop with a common shared error between them. This is a very robust control architecture. If one of the power source assets is lost, the error sustained is shared among the other assets. Multiple controllers (under the control of the optimizer 210) operating on the error can help the response to changes in the system. Each power source asset 220A, 220B, 220C, . . . 220N, can have its own controller 200B as shown in FIG. 2B, and the controller 200B can be tailored for the type (wind, solar, coal, natural gas, etc.) of asset. The overall control of the farm is then inherent based on what power source assets are available and optimal for use at any time.

In some embodiments, the different power source assets 220A, 220B, 220C, . . . 220N may be part of a virtual power plant. In this example, a plurality of classes of power assets are included in the virtual power plant and a cloud-based central control system may control power aggregation of the distributed power sources.

FIG. 2B illustrates a framework 200B of a power controller that may be incorporated or otherwise used by a power asset such as power assets 220A, 220B, 220C, . . . 220N, etc., shown in FIG. 2A. Each of the power source assets in the system may include its own control framework thereby enabling independent (separate) and dynamic control differently among the different classes of power source assets.

Referring to FIG. 2B, the framework 200B includes a power source 280. In the exemplary embodiment, power source 280 generates electrical energy. Power source 280 includes, but is not limited to, a gas engine, a coal fired turbine, petroleum-based power sources, a nuclear generator, a wind turbine, solar cells, a hydroelectric generator, a geothermal tap, and any other device capable of generating energy. In some embodiments, power source 280 includes or is a virtual power device, such as one created through a demand response event or a grouping of power assets that are not co-located, but are controlled as a single asset. Each different power source 280 includes several attributes or parameters that control the operation of the corresponding power source 280.

For example, batteries are quick to respond to changes in power output and can be used when a rapid increase in power is required. However, batteries drain and have to be recharged. Generally, batteries cannot be used for extended periods of time. Another example is gas engines, which are capable of providing power for periods of time longer than batteries, but require an amount of time to power up. A third example is fuel cells, which provide efficient power over long periods of time, but require significant amounts of time to increase power output. In the exemplary embodiment, the fuel cells are solid oxide fuel cells. Other potential attributes include the condition of the power source 280, past operation of the power source 280, and other attributes or parameters as desired by the operators of the power source 280.

The framework 200B controls an amount of energy produced by power source 280. In the exemplary embodiment, the framework 200B further includes a pre-processing module 250 (referred to herein as M1), controller gains Kp 282 and Ki 284, an integrator 286, and an asset control module 270 (referred to herein as M3). Furthermore, the framework 200B also includes a post-processing module 260 (referred to herein as M2). In this example, the pre-processing module 250 may include any type of element for power error adaption including, but not limited to, a low pass filter, a high pass filter, a band-pass filter, a band-stop filter, a rate limiter, a user-override setting, and the like. This allows the power output to be switched between different power output modes as further described below and which can include a free running mode, a renewable mode, and a full curtailment mode. The post-processing module 260 is optional and provides a way to bypass the control algorithm. In addition, the asset control module 270 provides an interface to receive asset power setpoint from the supervisory layer, such as economic optimizer and unit commitment command.

According to various embodiments, each of the pre-processing module 250, the post-processing module 260, and the asset control module 270 may receive control signals 252, 262, and 272, respectively, from the supervisory layer of the system shown in FIG. 2A. For example, the optimizer 210 (or the plant controller 230 shown in FIG. 2C) may provide control signals to modify an operation of any of the modules 250, 260, and 270 based on current needs of the overall power system. The values of the pre-processing module 250, the post-processing module 260, and the asset control module 270 may be managed by the dispatch operator 210. In some embodiments, the controls of each of the different classes of assets may be managed/controlled differently to achieve different cost or power margin objectives of the plant as a whole.

According to various embodiments, the pre-processing module 250 may be controlled to change the type of filter being used in order to change gains on the bleed around an integrator. In this case, the filter logic of the pre-processing module can be dynamically adjusted to change a shape of an error that is being fed into the power source 280. As another example, the asset control module 270 may be adjusted to operate the power source 280 at a different set point than given by the initial setpoint (utility). Here, the asset control module 270 could by dynamically adjusted such that the power set point of a class of power sources 280 (group) gradually biases around a desired point over a longer period of time, whereas the pre-processing module 250 can be adjusted to change the shape of the error being fed to the power source immediately. As another example, the post-processing module 260 may be instructed to bypass the control altogether and feed a certain power amount, etc. to the power source. Here, the post-processing module 260 may disable the signal through a switch, or other means. Furthermore, the different classes of assets shown in FIG. 2B can be adjusted differently based on various types of modes that are being performed on the plant. In other words, for the different asset classes, it is possible to modify the pre-processing module 250, the post-processing module 260, and/or the asset control module 270, differently, based on an overall cost or margin goal of the power plant as a whole.

When the pre-processing module 250 accepts an error amount, the error amount may be transmitted to controller gains Kp 282 and Ki 284. Controller gains Kp 282 and Ki 284 may each be tuned in order to provide the desired response from power source 280. For example, if error amount is 10 MW, controller gains Kp 282 and Ki 284 may each be set at 0.1. This yields a 1 MW initial step in power output of power source 280, with an initial ramp rate of 1 MW/second that diminishes as the observed power error approaches 0 MW. In the exemplary embodiments, Kp 282 and Ki 284 are based on attributes of power source 280. In one example, Kp 282 and Ki 284 are configured to slowly or quickly increase the power output of power source 202.

The integrator 286 may track the amount of power produced by power source 280. Using the above example, Kp 282 and Ki 284 are both set to 0.1 and the output of each is 1 MW. Power source 280 was producing 20 MW and a new Power Setpoint of 30 MW is received. Integrator 286 receives the 1 MW output and increases its setting to 21 MW. The output of integrator 286 begins ramping its output at a rate of 1 MW/Second and its controller output is combined with the output of Kp 282. After one second, the combined power controller output is a total of 22 MW. A power controller may instruct power source 280 to produce 22 MW of power. If the error amount is not reduced to zero and the error amount is still within the frequency accepted by the power controller's filter, power controller 204 will receive an error amount 126 of 8 MW and the process will repeat.

The asset control module 270 may also be referred to as an asset control module. The asset control module 270 can be used to reduce or increase the set point of power output by the power source 280 based on a set point provided from the supervisory layer such as the optimizer 210 or a plant controller. An example includes, but is not limited to, where the optimal power setpoint of an asset deviates from the power set point initially provided from a utility. In another example, a supervisory controller defines optimal setpoints for each asset based on the most efficient operating conditions, or lowest cost operation. Yet another example includes preparing system 100 for particular scenarios, i.e. always making sure the battery is charged enough to handle unscheduled grid outages.

In the example of FIG. 2A, each class of power sources includes its own respective power controller represented by framework 200B.

FIG. 2C illustrates an alternative architecture 200C of a power source asset in accordance with some embodiments. In this example, the architecture 200C includes a plant operator 230 (workstation, computing terminal, etc.) that interacts and receives suggestion from the dispatch optimizer 210. For example, the dispatch optimizer 210 may provide predictions on the total load of the overall system, electricity prices, fuel prices, environmental monitoring on power source assets, and the like, to the plant operator 230. This example also includes a dispatchable load 240 and an uncontrolled load 245.

In the configuration of FIG. 2C, the plant controller 230 may coordinates the setpoints and configurations for each group of power source assets 220A, 220B, 220C, ... 220N. In this example, the dispatch optimizer 210 may generate desired setpoints for each asset class of power source assets 220A, 220B, 220C, ... 220N, based on a variety of optimization functions. Furthermore, the controllable load (dispatch load 240) may provide power consumptions that can be used to regulate the net power from the farm including the combined output from the other power source assets 220A, 220B, 220C, ... 220N. For example, the controllable load 240 may include a class of power source assets that include one or more of heating, ventilation, and air conditioning (HVAC), pool pumping, washing machines, lighting, and the like. As another example, the controllable load 240 may include energy storage devices such as batteries, etc. Here, the plant controller 230 may also coordinate a setpoint and configurations for the controllable load 240. Furthermore, the uncontrollable load 245 may provide a power consumption that can be observed as a disturbance to the net power of the farm. In some embodiments, the uncontrolled load 245 is required to run the components at a power plant that houses one or more of the plurality of power source assets 220A, 220B, 220C, ... 220N.

Based on the architecture described herein, the hybrid control system may implement various power output modes. The supervisory layer may prioritize full curtailment mode in order to fulfill grid requirements, but under standard operation may defer to hybrid optimization to define which mode to be operating within. Examples of control modes include a free running mode, a renewable run mode, and a full curtailment. In the free running mode, the farm level power set point may not be enforced. In this example, each power source asset class/type can be fed its own setpoint, and the control of each power source asset class is independent of the others.

As another example, in the renewable run mode, a farm level setpoint is enforced and renewable power source asset classes are not curtailed in this operating mode. In this example, energy storage and other assets with controllable fuel are utilized to meet the desired farm setpoint. For example, each power source asset class is biased around a desired setpoint, but will deviate to fulfill the farm power requirements. As another example, the full curtailment mode may enforce a farm level setpoint, as well. However, in this example, all of the power source asset classes may be curtailed to meet the farm setpoint. In this example, each power source asset class may be biased around a desired setpoint, but will deviate to fulfill the farm power requirements.

One of the challenges in controlling farms with multiple types of assets is when you respond with one asset (e.g., a battery) unless there's a reason for it, the asset is going to remain at the set power level. For example, if the farm is generating 2 MW of power, the farm might use the battery to respond quickly, but the battery only has a limited amount of energy that it can hold and will run out of charge at some point. The control framework of the example embodiments provides the ability to transition power away from the batteries to other assets that make sense, dynamically over time.

FIG. 3A illustrates a bode plot 300A of power responses of different power source assets in accordance with some embodiments. In this example, a first power source asset 302 may correspond to a fuel cell, a second power source asset 304 may correspond to a gas engine, and a third power source asset 306 may correspond to a battery. In this example, the bode plot 300A includes a magnitude plot, expressing the magnitude of the frequency response in decibels, and a phase plot, expressing the phase shift, for each of the first power source asset 302, the second power source asset 304, and the third power source asset 306.

During power output operations, the goal is to use the right assets for the jobs. For example, batteries can respond quickly, but cannot respond for very long. As another example, a nuclear plant may respond slowly but may provide more sustainable power generation than a battery and for a longer period of time. In addition, a hybrid power generation plant may include renewable sources such as a wind turbine, solar panels, water, and the like. The example embodiments attempt to find a way to make sure these assets behave in a cohesive way such that the overall response is most appropriate for the current power need of the system. The overall power generation will follow the demand curve. This is a technical problem being addressed. The system may leverage the different response times of the different power source assets (e.g., batteries may respond in milliseconds, fuel cells may take minutes, wind turbines may take 10-20 seconds, etc.)

FIG. 3B illustrates a graph of total power plant output and individual source power outputs in accordance with some embodiments. In this example, an upper graph 310A identifies a power output 308 of the combined system of power asset sources over time. Here, the y-axis is power output and the x-axis is time. Meanwhile, in lower graph 310B, power output of each of the three different power source assets 302, 304, and 306 is shown.

As shown in graph 310A, the total power output 308 for the power system increases from 0 PU to 1 PU immediately. In graph 310B, power output from the third power source asset 306 (battery) increases immediately to meet the required demand of 1 PU. However, power output from the source asset 306 decreases as power output from the second power source asset 304 (gas engine) increases. As shown in graph 310A, during this transition total output power 308 does not change. Throughout graph 310B, power output from the first power source asset 302 (fuel cell) slowly increases until the fuel cell is providing effectively all of the power required for total power output 308. Additionally, the third asset 306 is shown to produce negative power for a period of time while the third power source asset 306 is recharging.

In this example, the battery is configured to immediately output power based on increased demand while the gas engine fires up. Then fuel cells slowly ramp up to meet increased demand while gas engine covers the difference between the amount of power produced by the fuel cell and the demand amount. In other scenarios, different configurations of power assets have different behaviors. In another scenario, the plurality of power assets include a plurality of batteries that are cycled through before transferring power to fuel cells which recharge them. In an additional scenario, the filter logic module for the gas engine knows that maintenance is scheduled to be performed on the gas engine on a certain day at a certain time and power down the gas engine in preparation.

FIG. 4 illustrates a method 400 for controlling power in a hybrid renewable power generation system in accordance with some embodiments. For example, the method 400 may be performed by a computing system such as a web server, a user device, a database, an on-premises server, a cloud platform, a desktop PC, a mobile device, and the like. Referring to FIG. 4, in 410 the method may include detecting a control signal for controlling plant power which is received from at least one of a dispatch optimizer and a plant operator station. For example, the control signal may include a request to modify power output of a hybrid renewable power generation system comprising a plurality of different power generation sources. For example, the request may include a request from a user, an automatically created request (e.g., by a dispatch optimizer, etc.), a request from a plant operator, and the like.

In 420 the method may include adjusting a renewable power source at the plant by dynamically modifying at least one of a shape of an error being fed to the renewable power source and a power set point of the renewable power source, and in 430, the method may include adjusting a non-renewable power source at the plant by dynamically and differently modifying at least one of a shape of an error being fed to the non-renewable power source and a power set point of the renewable power source. For example, the adjusting of the renewable power source and the non-renewable power source may include implementing one of a free running mode in which the renewable power source and the non-renewable power source are each fed a unique power set point independently of each other, a renewable run mode in which power output by the renewable power source is not curtailed while power output by non-renewable power source is curtailed, and a full curtailment mode in which power output by each of the plurality of different power generation sources is curtailed.

In 440, the method may include adjusting a controllable load at the plant by dynamically modifying at least one of an error being fed to the controllable load and a power set point of the controllable load. For example, the controllable load (dispatch load 240) may provide power consumptions that can be used to regulate the net power from the farm including the combined output from the other power source assets. For example, the controllable load may include a class of power source assets that include one or more of heating, ventilation, and air conditioning (HVAC), pool pumping, washing machines, lighting, and the like. In some embodiments, the controllable load may include battery powers, or other energy storage means. Here, the plant controller may also coordinate a setpoint and configurations for the controllable load.

The adjusting performed in 420 and 430 may include a dynamic modification to a setting of a control module of the selected power generation source such as a pre-processing module (error shape), an asset control module (set point bias), and a post-processing module (bypass). The adjusting may include generating a signal that increases or decreases a power set point of the selected power generation source which is established by a utility. In some embodiments, the generating may include generating a signal that modifies filter logic that is configured to reduce power output by the selected power generation source. In some embodiments, the generating may include generating a control signal that instructs the power control module to bypass a control algorithm used to control an amount of power output by the selected power generation source. In some embodiments, the generating may include generating a control signal that dynamically modifies a power set point of the selected power generation source to deviate from a power set point implemented by a utility.

In some embodiments, the generating may include generating different control signals for a plurality of different power generation sources, and transmitting the different control signals to the different power generation sources, respectively. In some embodiments, the generating may include generating a first control signal that adjusts a power set point of a renewable power generation source, and a second control signal that adjusts a power set point of a non-renewable power generation source to a different level than the power set point of the renewable power generation source.

In some embodiments, the control signal may be generated by a plant controller that coordinates set points for different classes of power generation sources. In some embodiments, the control signal may be generated by a dispatch optimizer that generates set points for different classes of power generation sources based on one or more optimization functions. In some embodiments, the control signal may trigger a free running mode in which the selected power generation source is fed a unique power set point independently of other power generation sources among the plurality of different power generation sources.

In some embodiments, the selected power generation source may be a renewable power generation source, the control signal triggers a renewable run mode in which power output by the renewable power generation source is not curtailed while power output by non-renewable power generation sources among the plurality of different power generation sources is curtailed based on remaining demand that is not generated by the renewable power generation source. In some embodiments, the control signal may trigger a full curtailment mode in which power output by each of the plurality of different power generation sources is curtailed.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
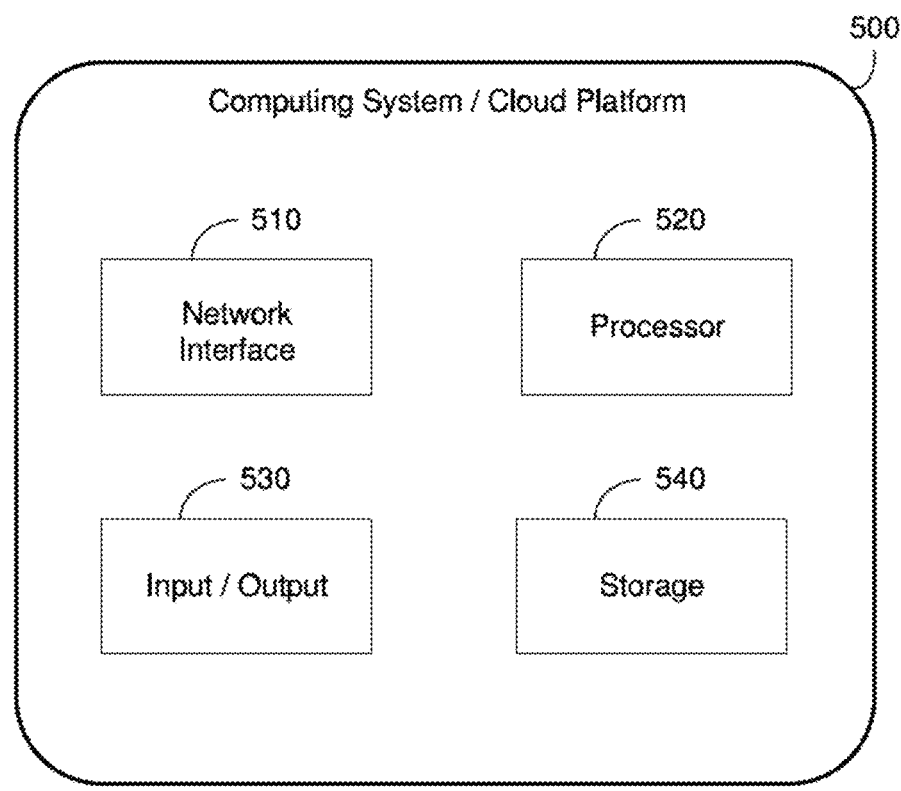
FIG. 5 is a diagram illustrating a computing system that can be used in the examples herein in accordance with some embodiments.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computing system 500 which may represent or be integrated in any of the above-described components, etc. FIG. 5 is not intended to suggest any limitation as to the scope of use or functionality of embodiments described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 500 may be a tokenization platform, server, CPU, or the like.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 5, the computing system 500 is shown in the form of a general-purpose computing device. The components of computing system 500 may include, but are not limited to, a network interface 510, one or more processors or processing units 520, an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 540 may include at least one program product having a set (e.g., at least one) of program modules that are configured to carry out the functions of various embodiments of the application.

Figure 6A:
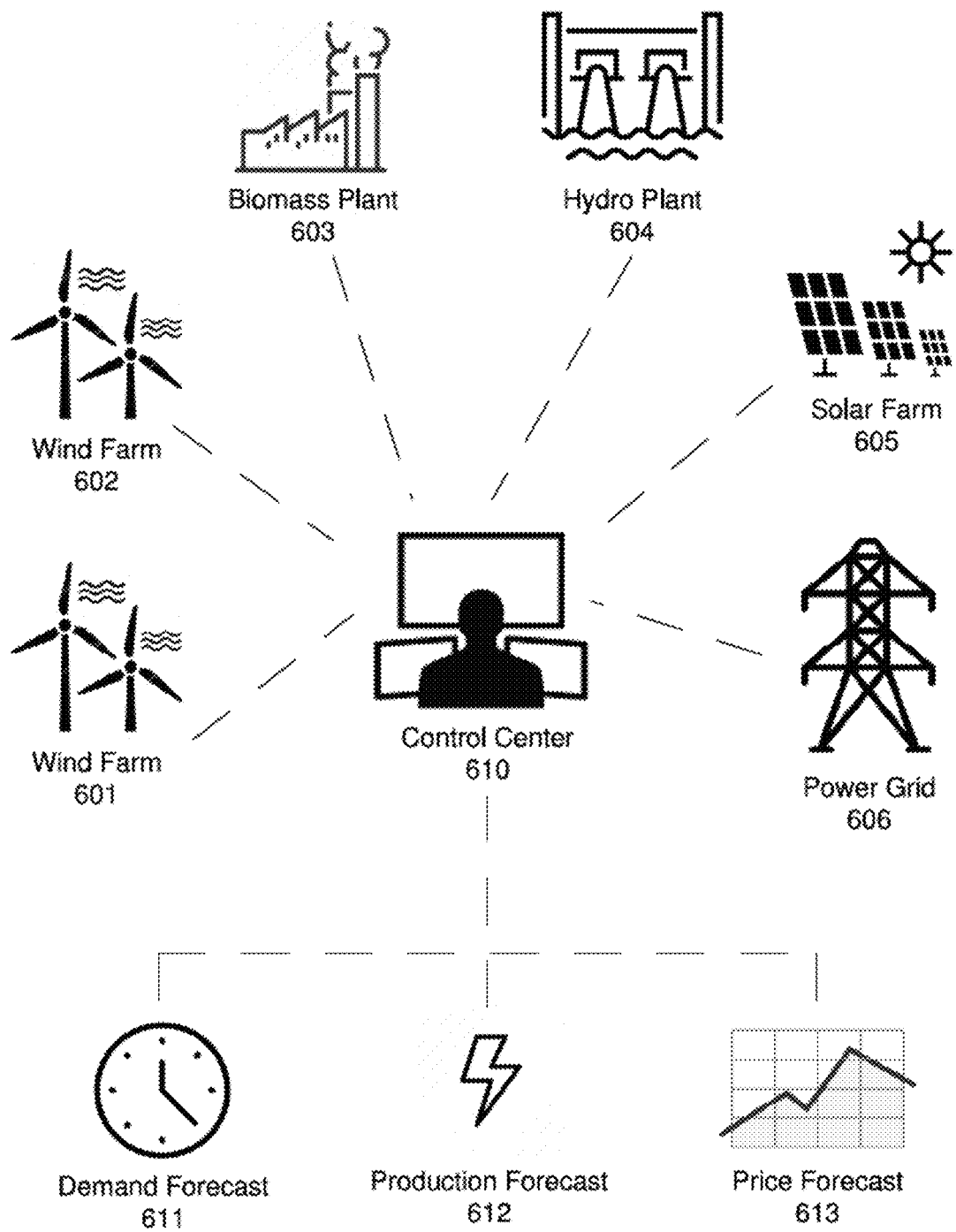
FIG. 6A is a diagram illustrating a control center of a virtual power plant in accordance with some embodiments.

FIG. 6A illustrates a control center 610 of a virtual power plant 600 in accordance with some embodiments. The control framework and the controller described herein may be implemented within the virtual power plant 600. In this example, the virtual power plant 600 includes distributed energy sources (DERs) including a wind farm 601, a wind farm 602, a biomass power plant 603, a hydropower plant 604, a solar power plant 605, and a power grid 606 which are connected to a central control center 601, such as through a network. The DERs may be centrally controlled by the central control center 610 which may be implemented within a cloud platform, web server, or the like.

The control center 610 may be used to aggregate production data from various distributed energy resources (DERs). Examples of DERs include solar PV plants, battery storage facilities or residential systems connected to the grid. These data centers use various communication technologies and internet of things (IoT) sensors to gather data, which allows an operator to monitor and control the production of each plant from the control center 610 or the like. By integrating several types of power sources such as solar, wind, small hydro and batteries, virtual power plants enable a reliable power supply. It also allows utilities to generate electricity using renewable energy sources, store it in battery banks and then supply it to customers. The control of the production of power by the DERs may be controlled based on various attributes including one or more of a demand forecast 611, a production forecast 612, a power price forecast 613, and the like.

Figure 6B:
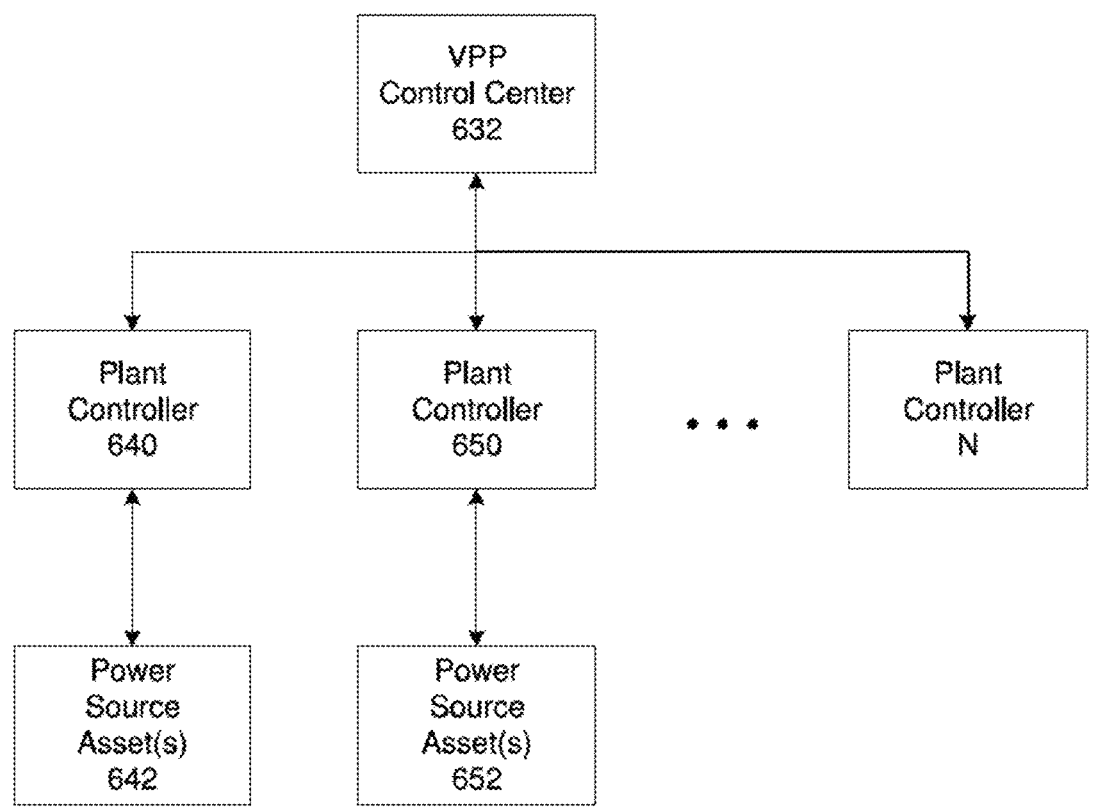
FIGS. 6B and 6C are diagrams illustrating plant controllers that can manage power source assets in a virtual power plant in accordance with some embodiments.
Figure 6C:
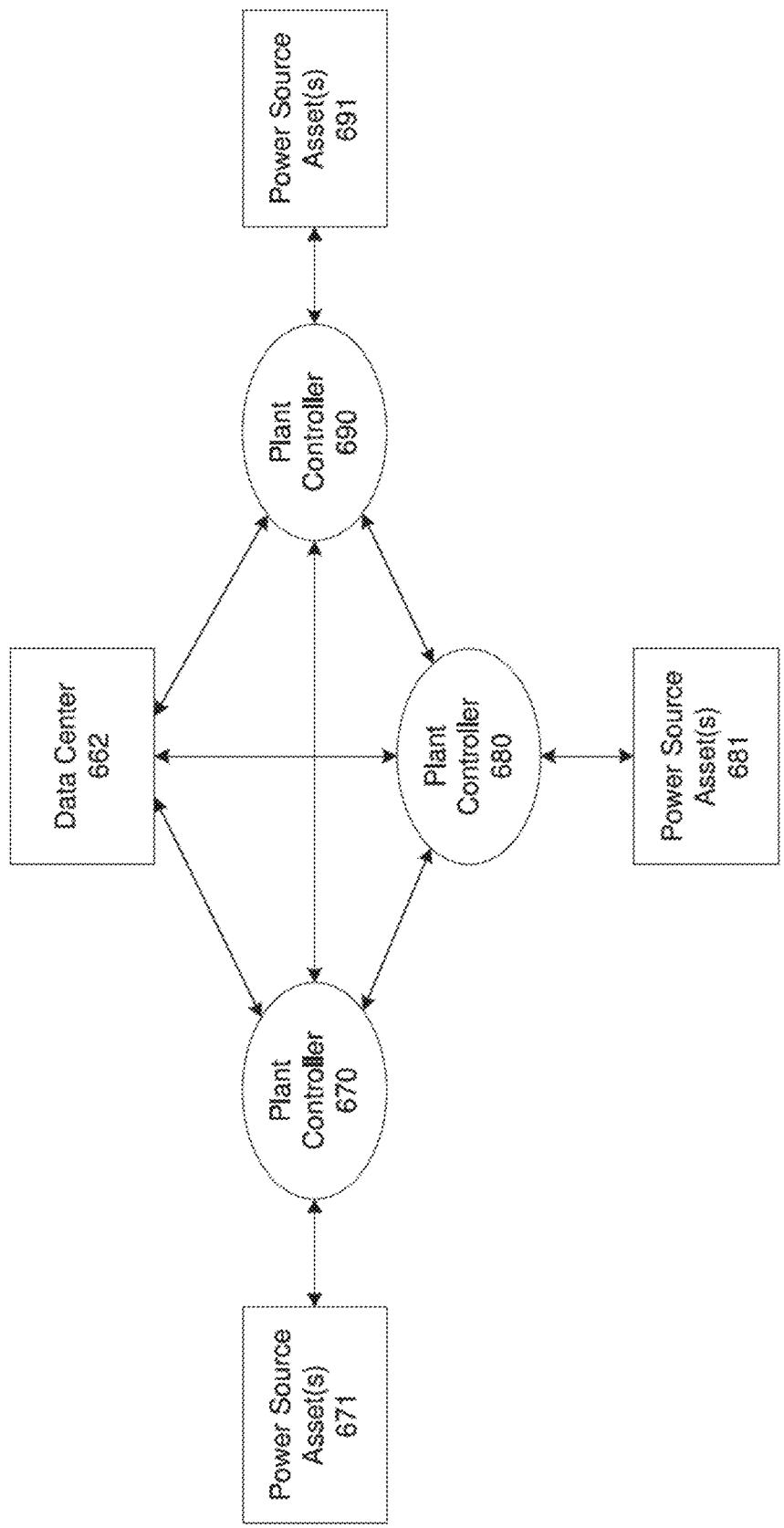

FIGS. 6B and 6C illustrate systems that include plant controllers that can manage power source assets in a virtual power plant in accordance with some embodiments. Referring to FIG. 6B, a system 630 includes a VPP control center 632, a plant controller 640 that controls multiple power source assets 642, a plant controller 650 that controls multiple power source assets 652, and possible more additional plant controllers, etc. The system 630 of FIG. 6B illustrates an example of how plant controller can manage multiple assets (not necessarily co-located) to form a virtual power plant. In this example, the VPP control center 632 is a centralized controlled VPP (ccVPP) that may receive detail information from each plant, and dispatch each plant controller directly. In some embodiments, the VPP control center 632 can have more diverse control modes and better control performance at the cost of additional communication load and heavy computational load. Any change or abnormal event that occurs at individual controller may lead to the recalculation or even re-structuring for the VPP control center 632. Therefore, the compatibility and scalability may be relatively.

FIG. 6C illustrates a system 660 that includes plant controllers which can manage multiple power source assets that are not necessarily co-located. In this example, the system 660 includes a data center 662 and a plurality of plant controllers 670, 680, and 690 corresponding to power source assets 671, 681, and 691, respectively.

This embodiment shows that how plant controller can manage multiple assets (not necessarily co-located) to form a virtual power plant which is fully decentralized controlled. Compared to the centralized controlled VPP (VPP control center 632 in FIG. 6B), the decentralized controlled VPP (dcVPP) is formed by autonomous plant controllers 670, 680, and 690 which communicate with each other. The VPP control center has been reduced to the data center 662 which provides information such as market price, weather forecasting and data records. This dcVPP is more like multi-agent system commonly used in the artificial intelligence area. The coordination and dispatching task conducted in the traditional VPP control center has been replaced by the direct mutual communication and coordination among the different plant controllers. Therefore, the compatibility and scalability of the dcVPP is higher than that of the VPP control center 632.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

In these examples, the computing system 500 may implement the dispatch optimizer 210 and/or the plant controller 230 shown in FIGS. 2A and 2C. As another example, the computing system 500 may be attached to or otherwise coupled with a power source asset such as power source assets 220A, 220B, 220C, . . . 220N.

In an example in which the computing system 500 is the dispatch optimizer, the processor 520 may receive a request to modify power output of a hybrid renewable power generation system comprising a plurality of different power generation sources, select a power generation source among the plurality of different power generation sources based on the received request, and generate a control signal comprising a dynamic modification to a setting of a control module of the selected power generation source. In addition, the network interface 510 may transmit the generated control signal to a communication interface of the control module of the selected power generation source.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular power grid components, any of the embodiments described herein could be applied to other types of electrical power grid components (including dams, windfarms, batteries, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A power system, comprising:
a plurality of classes of power assets, at least one class comprising a non-renewable power source and at least one class comprising a renewable power source; and
a power controller configured to manage a class of power assets from among the plurality of classes, the power controller comprising:
a pre-processing module comprising a first program module configured to dynamically shape an error being fed into a respective power source of the class of power assets by changing a type of filter used to shape the error in response to receiving a control signal to reduce power output of the class of power assets; and an asset control module comprising a second program module configured to dynamically adjust a power setpoint of the respective power source of the class of power assets,
wherein the dynamically changing a type of filter by the pre-processing module and the dynamically adjusting a power setpoint by the asset control module are based on the class of the power assets and based on an overall cost or margin goal of the power system as a whole.

2. The power system of claim 1, wherein the power controller further comprises a post-processing module comprising a third program module configured to dynamically disable a control algorithm of the power source of the class of power assets.

3. The power system of claim 1, wherein the power system further comprises a dispatch optimizer, and the control signal is received from the dispatch optimizer.

4. The power system of claim 3, wherein the dispatch optimizer is configured to generate the control signal based on one or more cost-based optimization functions.

5. The power system of claim 1, wherein the control signal is received from a plant operator.

6. The power system of claim 1, wherein power controller is configured to dynamically control at least one of the pre-processing module and the asset control module to modify the class of power assets to output an amount of power that deviates from a power set point provided by a utility.

7. The power system of claim 1, wherein the pre-processing module is configured to dynamically adjust filtering logic to dynamically shape the error being fed into the respective power source of the class of power assets.

8. The power system of claim 1, wherein the asset control module is configured to gradually bias the power setpoint of the respective power source of the class of power assets to a dynamic threshold.

9. The power system of claim 1, wherein the class of power assets comprise a renewable power source comprising at least one of a wind power source, a solar power source, a hydro power source, and a geothermal power source.

10. The power system of claim 1, wherein the class of power assets comprise a non-renewable power source comprising at least one of a petroleum source, a natural gas source, and a coal source.

11. The power system of claim 1, wherein the class of power assets comprise a controllable load comprising one or more of heating, ventilation, and air conditioning (HVAC), pool pumping, a washing machine, energy storage devices, and lighting.

12. The power system of claim 1, wherein the power controller is configured to manage at least two different types of classes of power assets from among the plurality of classes, where each of the different types of classes comprises different types of power sources.

13. A power system, comprising:
a plurality of classes of power assets, where each class of power assets comprises a different type of power source;
a first power controller configured to manage a first class of power assets from among the plurality of classes which comprises a renewable power source; and
a second power controller configured to manage a second class of power assets from among the plurality of classes which comprises a non-renewable power source,
wherein the first and second power controllers each comprise:
a pre-processing module comprising a first program module configured to dynamically shape an error being fed into a respective power source of a respective class of power assets by changing a type of filter used to shape the error in response to receiving a control signal to reduce power output of a respective class of power assets; and
an asset control module comprising a second program module configured to dynamically adjust a power setpoint of the respective power source of the respective class of power assets,
wherein the dynamically changing a type of filter by the pre-processing module and the dynamically adjusting a power setpoint by the asset control module are based on the class of the power assets and based on an overall cost or margin goal of the power system as a whole.

14. The power system of claim 13, wherein the first and second power controllers further comprise a post-processing module comprising a third program module configured to dynamically disable a control algorithm of the power source of the class of power assets.

15. The power system of claim 13, wherein the plurality of classes of power assets are included in a virtual power plant comprising a cloud-based control system that controls aggregation of capacities of distributed power sources, the cloud based control system comprising at least one remote processing device.

16. The power system of claim 13, further comprising an optimizer configured to dynamically and differently modify the first power controller and the second power controller to control the renewable power source and the non-renewable power source to output different amounts of power based on a power system margin or a value of electricity.

17. The power system of claim 13, wherein the first and second power controllers control the first and second classes of power assets to implement a free running mode in which the renewable power source and the non-renewable power source are each fed a unique power set point independently of each other.

18. The power system of claim 13, wherein the first and second power controllers control the first and second classes of power assets to implement a renewable run mode in which power output by the renewable power source is not curtailed while power output by non-renewable power source is curtailed.

19. The power system of claim 13, wherein the first and second power controllers control the first and second classes of power assets to implement a full curtailment mode in which power output by each of the plurality of different power sources is curtailed.

20. A method comprising:
detecting a control signal for controlling plant power which is received from at least one of a dispatch optimizer or a plant operator station;
adjusting a renewable power source at the plant by dynamically modifying at least one of a shape of an error being fed to the renewable power source and a power set point of the renewable power source, wherein the shape of the error being fed to the renewable power source is modified by changing a type of filter used to shape the error fed to the renewable power source in response to receiving a control signal to reduce power output of the renewable power source; and adjusting a non-renewable power source at the plant by dynamically and differently modifying at least one of a shape of an error being fed to the non-renewable power source and a power set point of the non-renewable power source, wherein the shape of the error being fed to the non-renewable power source is modified by changing a type of filter used to shape the error fed to the non-renewable power source in response to receiving another control signal to reduce power output of the non-renewable power source, wherein the dynamically changing a type of filter and the dynamically modifying a power setpoint are based on a class of the power sources and based on an overall cost or margin goal of the plant as a whole.

\* \* \* \* \*